Feb. 7, 1933.  R. YUTTS  1,896,148
DUSTER AND MACHINE FOR MAKING THE SAME
Filed Nov. 12, 1931   7 Sheets-Sheet 4

Fig. 5.

Inventor
Ralph Yutts.
By Bryant & Lowry
Attorneys

Feb. 7, 1933.   R. YUTTS   1,896,148
DUSTER AND MACHINE FOR MAKING THE SAME
Filed Nov. 12, 1931   7 Sheets-Sheet 5

Fig. 6.

Inventor
Ralph Yutts.
By 
Attorneys

Patented Feb. 7, 1933

1,896,148

UNITED STATES PATENT OFFICE

RALPH YUTTS, OF MIAMI, FLORIDA

DUSTER AND MACHINE FOR MAKING THE SAME

Application filed November 12, 1931. Serial No. 574,665.

This invention relates to dusters and machines for making the same.

More particularly the invention relates to a machine for cutting, bunching and securing paper or fabric dusters, the duster made thereby and the method and process of making such dusters.

One important object of the invention is to provide an improved machine for this purpose wherein one or more plies of suitable paper, fabric or other material are fed off of rolls through the machine and are there cut, bunched and secured in bunched condition.

A second important object of the invention is to provide an improved machine for this purpose wherein two dusters are made simultaneously.

A third important object of the invention is to provide an improved machine of this kind wherein a web or strip is fed continuously through the machine and severed into sections, each suitable to form a duster and wherein a bunching device acts intermittently to effect the bunching operation.

A fourth important object of the invention is to provide an improved machine for this purpose having a reciprocating buncher which moves in one or forward direction to effect the bunching of a severed strip and in the opposite or return direction to take position for engaging and bunching a succeeding strip.

A fifth important object of the invention is to provide an improved machine of this class wherein the securing of the strip in bunched relation is effected during the return movement of the buncher.

A sixth important object of the invention is to provide an improved machine of this character wherein the return movement of the buncher is effected below the plane of advance of the paper to form the next bunch.

A seventh important object of the invention is to provide a novel form of paper duster capable of being made by this machine.

An eighth important object of the invention is to provide a novel method of forming such a paper duster.

With the above and other objects in view, the invention consists in general of a machine having certain novel details of construction and combinations of parts, a novel construction of duster and a novel method of manufacturing the same, all being hereinafter fully described, illustrated in the accompanying drawings and specifically claimed.

In the accompanying drawings, like characters of reference indicate like parts in the several views, and:—

In the embodiment of the machine as herein illustrated there is provided a pair of spaced side frames 10 having feet 11 and these frames are held in proper spaced relation by front and rear tie bars 12 securely bolted to the feet. In the upper part of the rear end of each frame there is provided a series of four vertical slots 13. These slots open through the top of the frames and the slots in one frame are alined opposite the slots in the other frame. Bearings 14 are seated in the bottoms of the slots 13 and upper bearings 15 are mounted in these slots above the bearings 14. The bearings 15 are urged upwardly by springs 16 interposed between the tops of the bearings 13 and the bottoms of the bearings 15. Cap strips 17 are securely bolted to the frames to close the upper ends of the bearing slots and adjusting screws 18 extend through these cap strips to engage the bearings 15. Lock nuts 19 are provided for these adjusting screws. By means of this arrangement the distances between the bearings 15 and 14 may be adjusted as desired.

Figure 1:
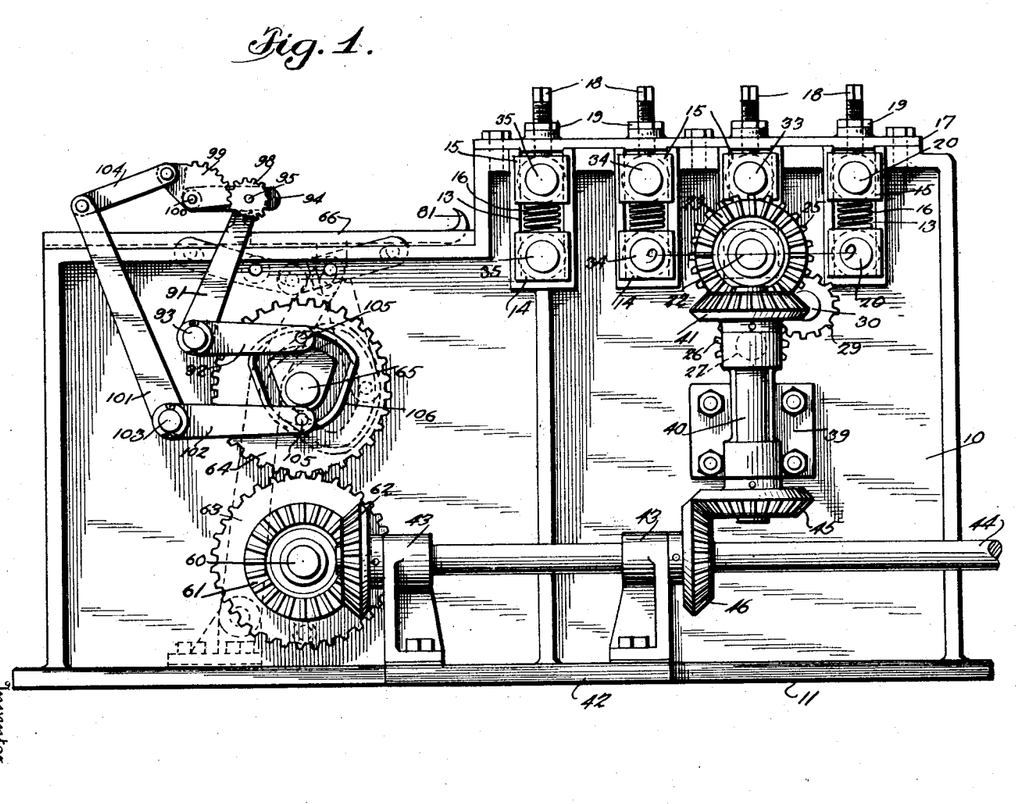
Figure 1 is a side elevation of a complete machine for forming dusters and showing what is termed the right side of the machine.
Figure 2:
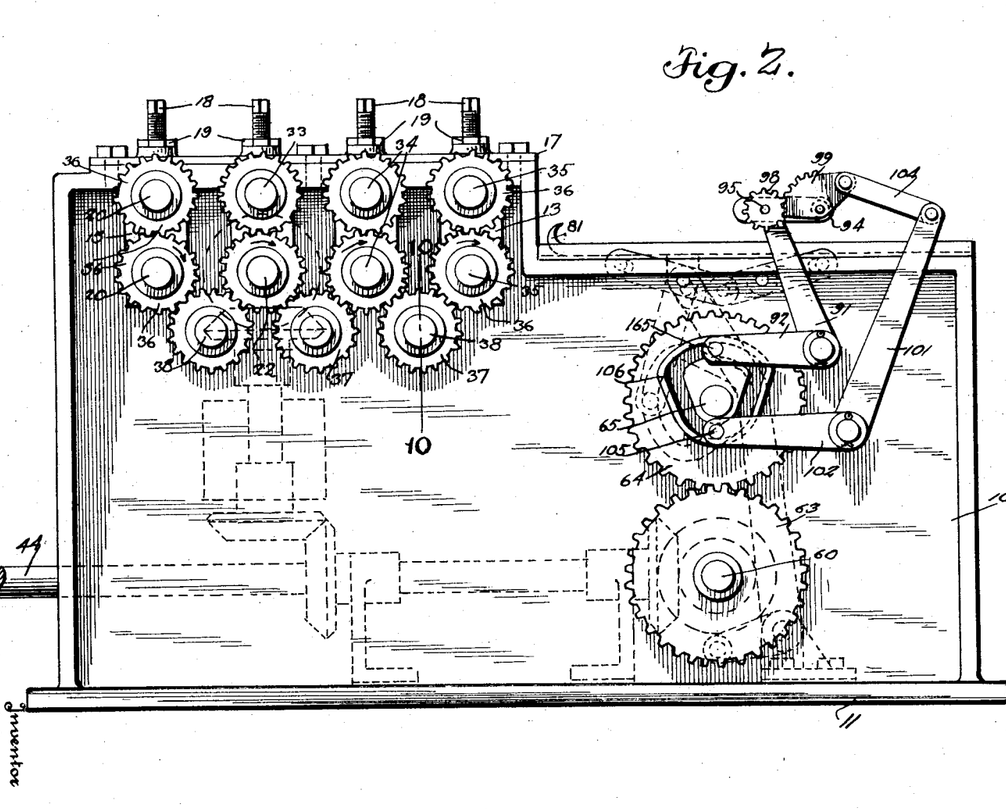
Figure 2 is a similar view showing the opposite or left side of the machine.
Figure 3:
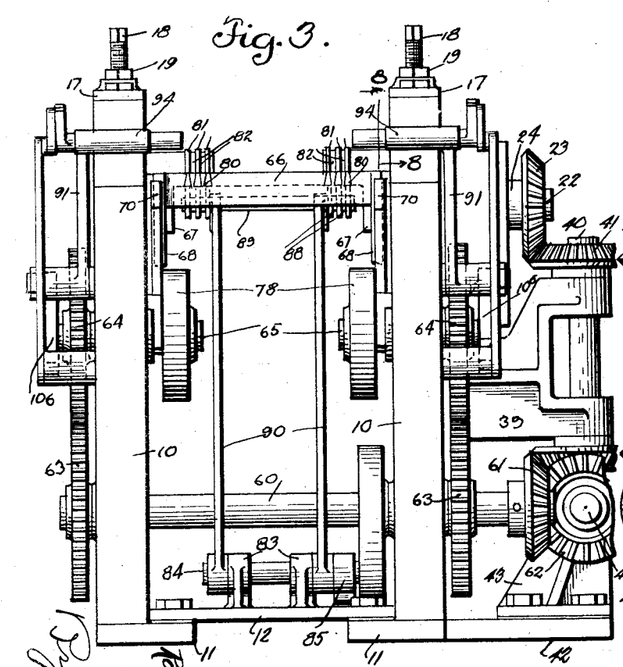
Figure 3 is an elevational view from the left or front end of Figure 1, only the parts at this end being shown.
Figure 4:
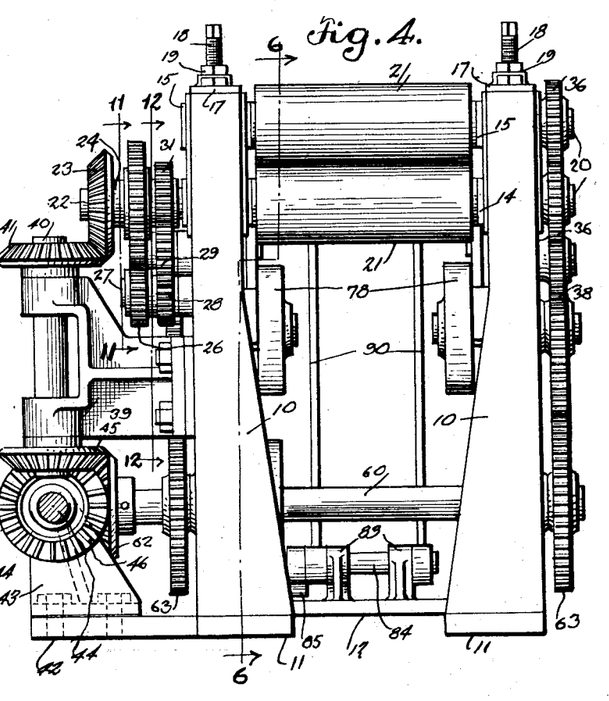
Figure 4 is a view similar to Figure 3 but showing the parts at the opposite end of the machine.
Figure 5:
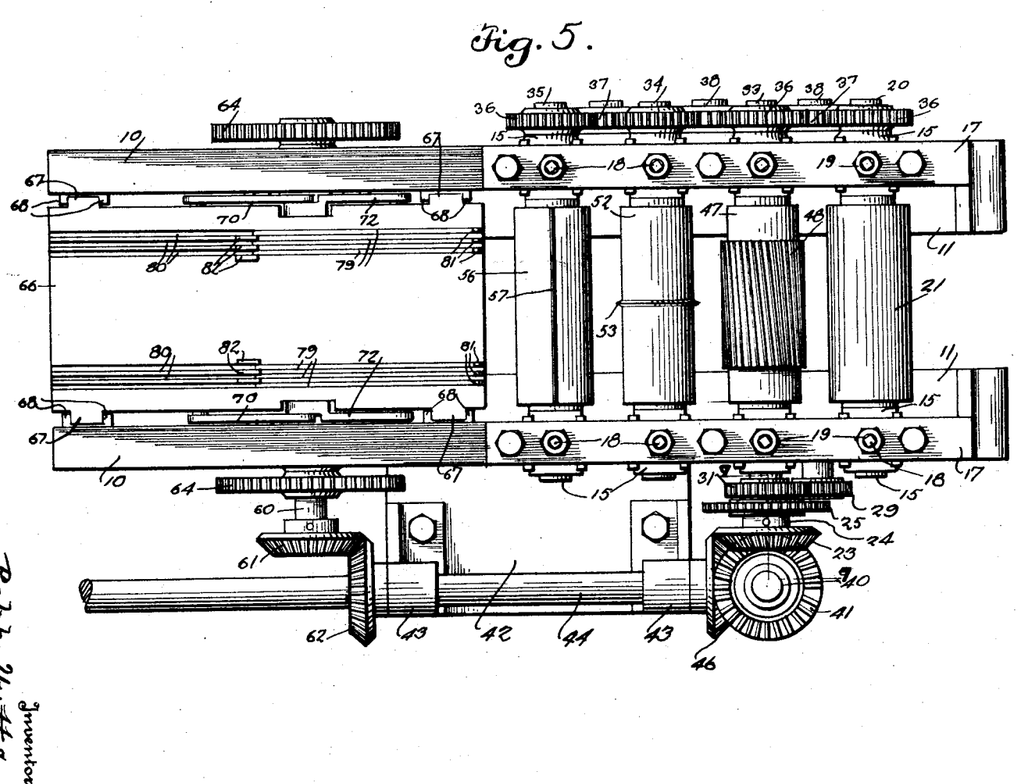
Figure 5 is a plan view of the machine with the devices for securing the bunch strips in bunched condition being omitted to avoid confusion with the other parts.
Figure 6:
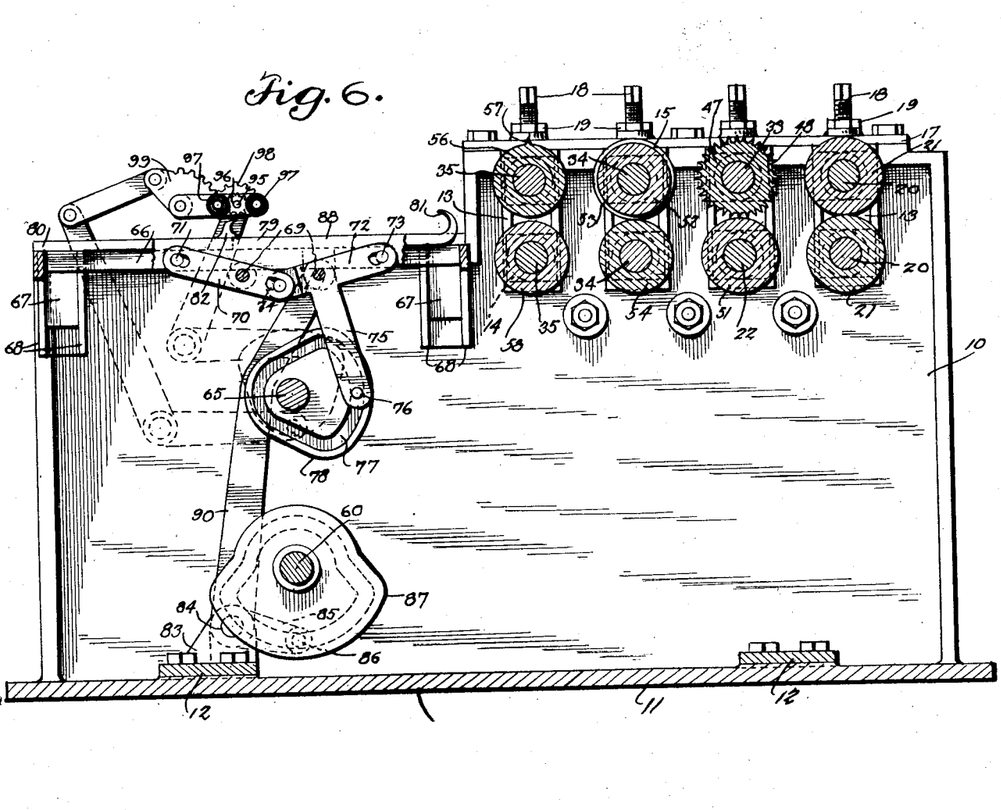
Figure 6 is a section on the line 6—6 of Figure 4.
Figure 7:
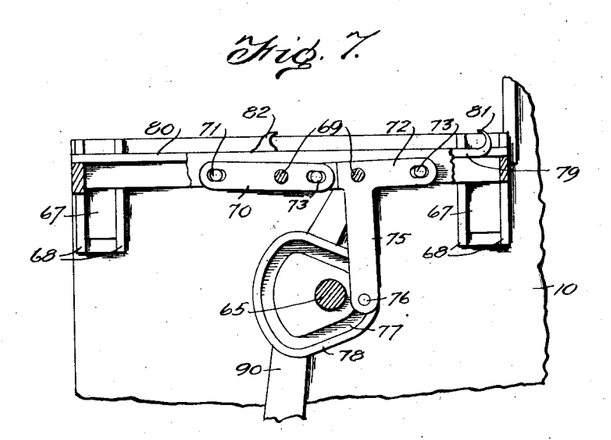
Figure 7 is a view similar to the upper left portion of Figure 6 but showing the table in dropped position.
Figure 8:
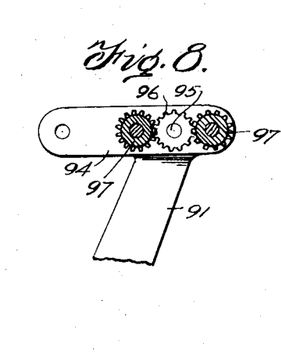
Figure 8 is a detail elevation of a buncher and its operating means, the view being substantially a section on the line 8—8 of Figure 3 with parts omitted.
Figure 9:
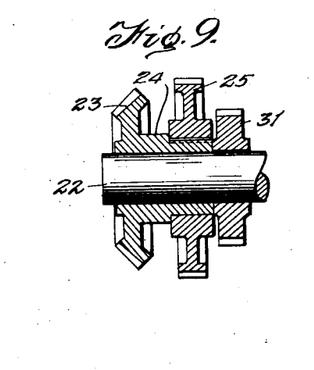
Figure 9 is a section on the line 9—9 of Figure 5.
Figure 10:
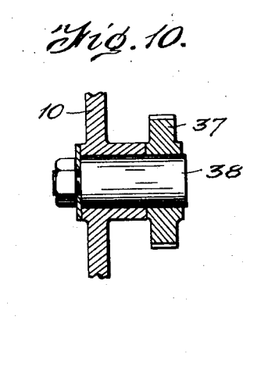
Figure 10 is a section on the line 10—10 of Figure 2.

In the extreme rear set of bearings is journalled a pair of shafts 20 which carry feed rollers 21 for feeding one or more (preferably four or six) plies of thin paper P through the machine. In the lower pair of bearings next forward of the rollers 21 is a shaft 22 on which is freely revoluble a bevel gear 23 having a hub 24. Keyed on the hub 24 is a gear 25 which meshes with a gear 26 fixed on a revoluble shaft 27. Fixed on the shaft 27 is a second gear 28 which meshes with an idler gear 29 which revolves on a shaft 30 and meshes with a gear 31 fixed on the shaft 22 and thus drives the shaft 22. Supported in the bearings above the shaft 22 is a shaft 33. In the next pair of slots toward the front of the machine the bearings support shafts 34 and in the forward slots the bearings support shafts 35. On the left side of the machine the shafts for each slot are geared together by gears 36 and the lower gears 36 mesh with idlers 37, as shown in Figure 2, supported on shafts 38 so that the lower gears all revolve in the same direction as indicated by the arrows on said figure.

Secured to the right side member 10 is a bearing bracket 39 which supports a shaft 40 carrying on its upper end a bevel gear 41 which meshes with the bevel gear 23. The right hand foot 11 has a lateral extension 42 which supports alined bearings 43 wherein is journalled a shaft 44 which is driven by any suitable means (not shown). On the lower end of the shaft 40 is a bevel gear 45 wherewith meshes a bevel gear 46 carried by the drive shaft 44. This forms the driving means for the gears 36.

On the shaft 33 is carried a roll 47, the middle portion of which is provided with spirally arranged cutters 48 so positioned as to cut closely spaced diagonal slits 49 in the middle portion of the paper strip P while leaving uncut marginal portions 50. On the shaft 22 is mounted a roll 51 constituting a platen against which the cutter blades 48 operate, this roll 51 being made of some suitable material which will not dull the sharp edges of the cutters 48 by contact therewith. On the upper shaft 34 is mounted a severing or dividing roll 52 having a central cutter blade 53 extending therearound and working on a platen roll 54 carried on the lower shaft 34. The blade 53 serves to divide the ribbon of paper P into longitudinally extending halves each of which includes one of the marginal portions and half of the slit portion, the dividing cut being shown at 55. The upper shaft 35 carries a roll 56 which has a single longitudinally extending cutter blade 57 running from end to end to extend entirely across the paper P and for a cut off blade to divide the paper into suitable lengths as at 58. This cutter 57 works on a platen roll 59 carried by the lower shaft 35.

By means of the apparatus which has now been described one or more plies of paper P are fed by the rolls 21 to move forwardly under the slitting roll 47 where the slits for forming the wisps are cut, then under the dividing roll 52 and the cut off roll 56 to divide the slit paper into halves and cut it into lengths suitable for bunching into proper sized dusters.

Journalled in the lower front parts of the frames 10 is a transverse shaft 60 carrying a bevel gear 61 which meshes with a bevel gear 62 on the drive shaft 44. On each end portion of the shaft 60 is mounted a gear 63 which meshes with a similar gear 64 fixed on a short shaft 65 journalled in a suitable bearing directly above the shaft 60. Thus the shafts 60 and 65 move into unison with the feeding and cutting mechanism previously described.

A table 66 is fitted between the front upper parts of the side frames 10 and is provided with depending legs 67 which work between guides 68 formed on the frames 10. At the top of each frame 10 is a pair of studs 69. A lever 70 is pivoted intermediate its ends on the forward stud 69 on each side and has pin and slot connection at 71 with the table. A T-shaped lever 72 has its head pivoted intermediate its ends to the rear stud 69 and has pin and slot connection to the rear part of the table at 73. The levers 70 and 72 on each side of the table have pin and slot connection at 74 so that rocking of a lever 72 will cause corresponding rocking of a lever 70 and thus both ends of the table will be raised simultaneously. Each lever 72 has a stem 75 which carries on its lower end a pin 76 working in the groove 77 of a cam 78 fixed on a respective shaft 65. The grooves 77 are so arranged as to hold the table raised during one part of the operation and hold it lowered during a second part by rocking the stems, 75, and thus the levers 72, first in one direction and then the other.

At each side of the table is a set of gathering or bunching bars 79 which work in grooves 80 and are provided on their rear ends with hooks 81 facing forwardly toward fixed gathering hooks 82 mounted on the table. The front cross bar 12 carries bearings 83 wherein is mounted a rock shaft 84 carrying on one end a rock arm 85. The end of the arm 85 carries a pin 86 which works in the groove of a face cam 87 fixed on the shaft 60. The bars 79 have depending legs 88 through which passes a rod 89 working in slots formed in the upper ends of rock arms 90 fixed on the shaft 84. The groove of the cam 87 is so shaped and the cams 78 and 87 are so positioned relative to each other that the bars 79 are reciprocated by the action of cam 87 in such manner that they move rearwardly as the table is depressed and forwardly as the table is raised. By this means each cut off length of paper is fed over the hooks 81 as they move rearwardly and is engaged by these hooks on its forward movement to draw the cut off lengths against the stops 82 and thus bunch the paper as shown at B in Figure 11.

Two methods may be adapted after the blanks are thus bunched to form the dusters. By one method a suitable wrapping or holding means may be applied by hand to the marginal portion of the bunched blank to hold it bunched or, by another method, the machine may be equipped with automatic means for wrapping such marginal portion. One such automatic means will now be described.

On each side of the machine, near the front, there is provided a bell crank consisting of arms 91 and 92 pivoted on a stud 93 carried by the frame member 10 on that side. The arm 91 is provided with an angularly disposed elongated head 94 wherein is journalled a shaft 95 provided with a gear 96 by which the shaft is geared to a pair of spaced rolls 97 suitably supported from the head. Also the shaft 95 carries a gear 98 wherewith meshes a segment 99 pivoted at 100 to the head. This head and the rolls carried thereby are so positioned that rocking of the bell crank in one direction will, at the time the paper is bunched, move the rolls down to lie on opposite sides of the bunched end. A second bell crank has arms 101 and 102 pivotally mounted on a stud 103 and the arm 101 is connected to the segment 99 by a link 104. The arms 92 and 102 carry pins 105 which work in the groove of a cam 106. This cam is so arranged as to actuate first the arm 92 to effect depression of the head and rolls and then to effect operation of the arm 102 to cause rotation in one direction and finally to restore the parts to normal position. By this means the bunch has its unsevered portion rolled between the rollers so that adhesive tape T may be rolled therearound and hold the blanks bunched.

Figures 11, 12, 13, 14:
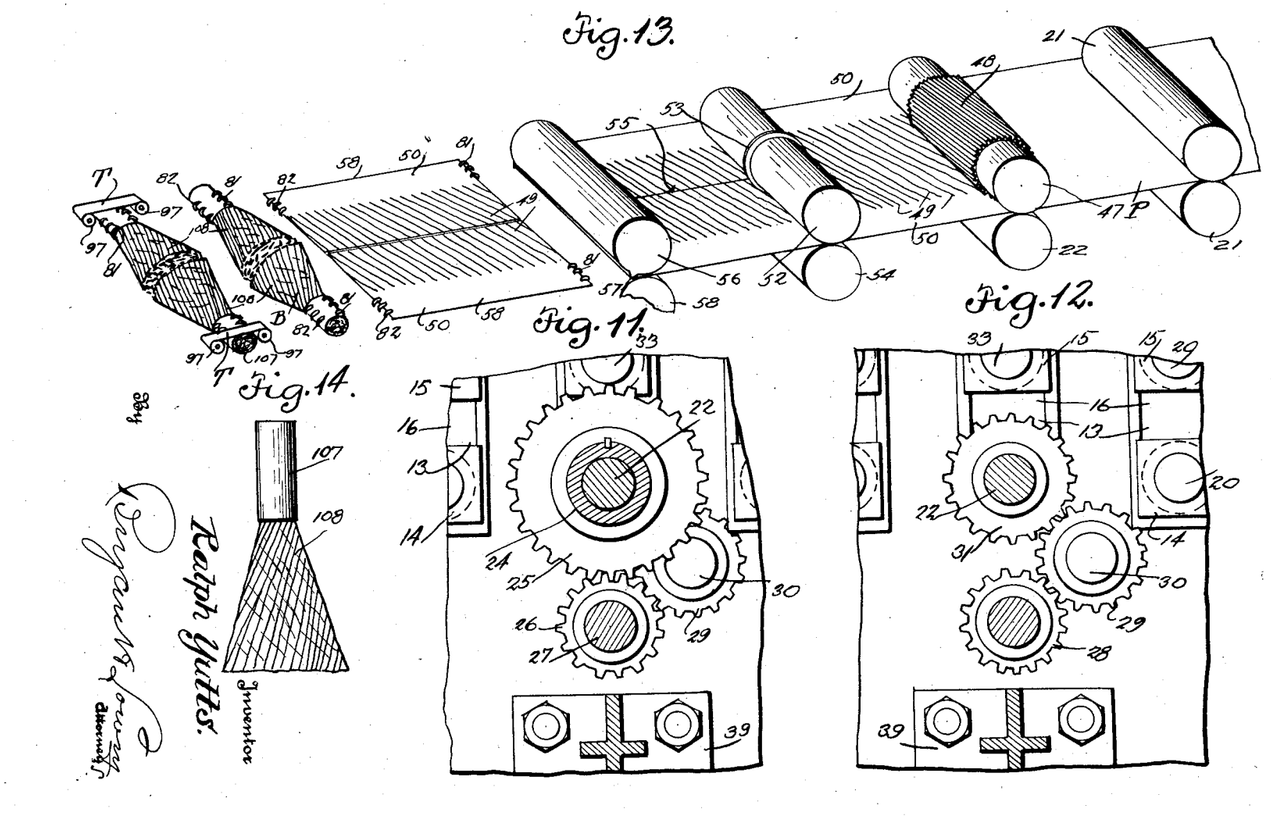
Figure 11 is an enlarged section on the line 11—11 of Figure 4.
Figure 12 is an enlarged section on the line 12—12 of Figure 4.
Figure 13 is a diagrammatic perspective showing the steps in the manufacture of the duster.
Figure 14 is a side elevation of the complete duster.

The complete duster, shown in Figure 12 thus consists of a secured end 107 and flaring wisps 108.

There has thus been provided a novel method for making paper dusters and a novel machine for effectually carrying the production of such dusters into practice.

It is obvious that changes may be made in the method and machine without departing from the scope of the claims. It is therefore to be understood that the invention includes all methods and mechanisms which properly fall within the scope of the appended claims.

Having thus described the invention, what is claimed is:—

1. The method of manufacturing dusters which includes the production of closely spaced slits across the central portion of a web of material, the dividing of the web longitudinally on its center line, the cutting of the divided web into lengths to form blanks, and the bunching of the unslit portions of said blanks into compact bundles.

2. The method of manufacturing dusters which includes the production of closely spaced slits across the central portion of a web of sheet material, the dividing of the web longitudinally on its center line, the cutting of the divided web into lengths to form blanks, the bunching of the unslit portions of said blanks into compact bundles, and the securing of said unslit portions in bunched condition.

3. The method of manufacturing dusters which includes the production of closely spaced slits across the central portion of a web of material, the dividing of the web longitudinally on its center line, the cutting of the divided web into lengths to form blanks, the bunching of the unslit portions of said blanks into compact bundles, and the wrapping of the bunched and unslit portions with adhesive tape.

4. A machine for making dusters including a web feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, and a bunching mechanism for bunching the unsevered edges of the blanks.

5. A machine for making dusters including a web feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, and reciprocating bunching hooks arranged to engage the rear edges of the blanks and bunch the blanks against said stops.

6. A machine for making dusters including a web feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, and means to raise and lower said hooks and stops and arranged to raise the hooks and stops during movement of the hooks to bunch the blanks and to lower the hooks and stops during movement of the hooks away from the stops.

7. A machine for making dusters including a web feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, and means to actuate said mechanisms and hooks in timed relation.

8. A machine for making paper dusters including a paper strip feeding mechanism, a paper web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, means to raise and lower said hooks and stops and arranged to raise the hooks and stops during movement of the hooks to bunch the blanks and to lower the hooks and stops during movement of the hooks away from the stops, and means to actuate said last means, the hooks and mechanisms in timed relation.

9. A machine for making paper dusters including a paper strip feeding mechanism, a paper web slitting mechanism arranged to slit the central portion of the web with closely spaced slits, a web dividing mechanism arranged to cut the slit web into halves longitudinally of the web, a cut off mechanism for cutting said halves into blanks of equal length, a bunching mechanism for bunching the unsevered edges of the blanks, and a bunch wrapping device associated with the bunching mechanism to wrap the unslit portions of the blanks.

10. A machine for making paper dusters including a paper strip feeding mechanism, a paper web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, and a bunch wrapping device arranged to move into and out of operative relation to bunched blanks resting against said stops.

11. A machine for making paper dusters including a paper strip feeding mechanism, a paper web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, means to raise and lower said hooks and stops and arranged to raise the hooks and stops during movement of the hooks to bunch the blanks and to lower the hooks and stops during movement of the hooks away from the stops, and a bunch wrapping device arranged to move into operative relation to bunched blanks held against said stops in lowered position of the latter and to move out of operative relation thereto when the stops are in raised position.

12. A machine for making dusters including a web feeding mechanism, a paper web slitting mechanism arranged to slit the central portion of the web with closely spaced slits, a web dividing mechanism arranged to cut the slit web into halves longitudinally of the web, a cut off mechanism for cutting said halves into blanks of equal length, a bunching mechanism for bunching the unsevered edges of the blanks, a bunch wrapping device associated with the bunching mechanism to wrap the unslit portions of the blanks, and means to actuate said mechanism, hooks and wrapping device in timed relation.

13. A machine for making dusters including a web feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, a bunch wrapping device arranged to move into and out of operative relation to bunched blanks resting against said stops, and means to actuate said mechanisms, hooks and wrapping device in timed relation.

14. A machine for making dusters including a feeding mechanism, a web slitting mechanism arranged to slit the central portion of the web with closely spaced slits, a web dividing mechanism arranged to cut the slit web into halves longitudinally of the web, a cut off mechanism for cutting said halves into blanks of equal length, stops against which the forward ends of the blanks engage, reciprocating bunching hooks arranged to engage the rear edges of the blanks and bunch the blanks against said stops, means to raise and lower said hooks and stops and arranged to raise the hooks and stops during movement of the hooks to bunch the blanks and to lower the hooks and stops during movement of the hooks away from the stops, a bunch wrapping device arranged to move into operative relation to bunched blanks held against said stops in lowered position of the latter and to move out of operative relation thereto when the stops are in raised position, and means to actuate the raising and lowering means, the hooks, said mechanisms and bunch wrapping device in timed relation.

15. In a machine for making dusters, a pair of web feeding rolls, cooperating web slitting and platen rolls including slitting blades on the central portion of the slitting roll, a web dividing roll having a blade extending centrally therearound, a blank cutting off roll having a blade extending from end to end thereof, platen rolls for the dividing and cutting off rolls, and means to rotate said rolls in unison.

16. In a machine for making dusters, a pair of web feeding rolls, cooperating web slitting and platen rolls including slitting blades on the central portion of the slitting roll, a web dividing roll having a blade extending centrally therearound, a blank cutting off roll having a blade extending from end to end thereof, platen rolls for the dividing and cutting off rolls, and means to rotate said rolls in unison, a table onto which cut off blanks are fed from the cutting off roll, stops on said table against which said blanks engage at their forward ends, hooks carried by the table and adapted to engage the rear ends of the blanks and draw them toward the stops, and means to operate said hooks in unison with said rolls.

17. In a machine for making dusters, a pair of web feeding rolls, cooperating web slitting and platen rolls including slitting blades on the central portion of the slitting roll, a web dividing roll having a blade extending centrally therearound, a blank cutting off roll having a blade extending from end to end thereof, platen rolls for the dividing and cutting off rolls, means to rotate said rolls in unison, a table onto which cut off blanks are fed from the cutting off roll, stops on said table against which said blanks engage at their forward ends, hooks carried by the table and adapted to engage the rear ends of the blanks and draw them toward the stops, means to operate said hooks in unison with said rolls, and means to hold the table raised as the hooks move toward the stops and to lower the table as the hooks move away from the stops.

18. In a machine for making dusters, a pair of web feeding rolls, cooperating web slitting and platen rolls including slitting blades on the central portion of the slitting roll, a web dividing roll having a blade extending centrally therearound, a blank cutting off roll having a blade extending from end to end thereof, platen rolls for the dividing and cutting off rolls, means to rotate said rolls in unison, a table onto which cut off blanks are fed from the cutting off roll, stops on said table against which said blanks engage at their forward ends, hooks carried by the table and adapted to engage the rear ends of the blanks and draw them toward the stops, means to operate said hooks in unison with said rolls, a device to wrap the bunched ends of the blanks, and operating means for said device arranged to operate the same in timed relation to the movements of said hooks.

19. In a machine for making dusters, a pair of web feeding rolls, cooperating web slitting and platen rolls including slitting blades on the central portion of the slitting roll, a web dividing roll having a blade extending centrally therearound, a blank cutting off roll having a blade extending from end to end thereof, platen rolls for the dividing and cutting off rolls, means to rotate said rolls in unison, a table onto which cut off blanks are fed from the cutting off roll, stops on said table against which said blanks engage at their forward ends, hooks carried by the table and adapted to engage the rear ends of the blanks and draw them toward the stops, means to operate said hooks in unison with said rolls, means to hold the table raised as the hooks move toward the stops and to lower the table as the hooks move away from the stops, a device to wrap the bunched ends of the blanks, and operating means for said device arranged to operate the same in timed relation to the movements of said hooks.

In testimony whereof I affix my signature.

RALPH YUTTS.